W. J. BROWN.
COUPLING DEVICE.
APPLICATION FILED APR. 2, 1917.
1,295,686.
Patented Feb. 25, 1919.
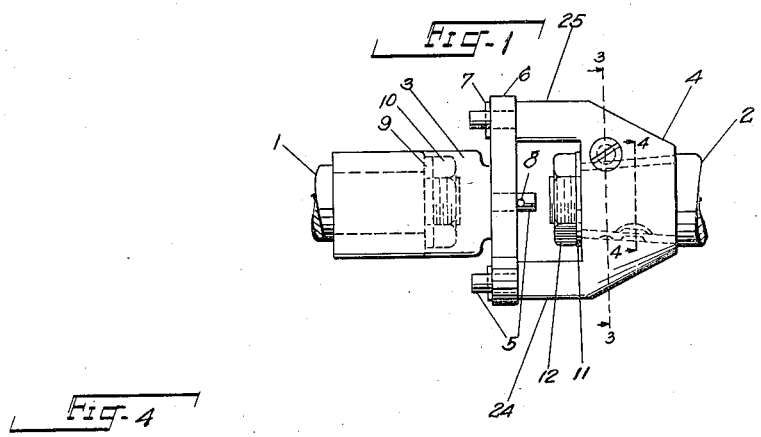
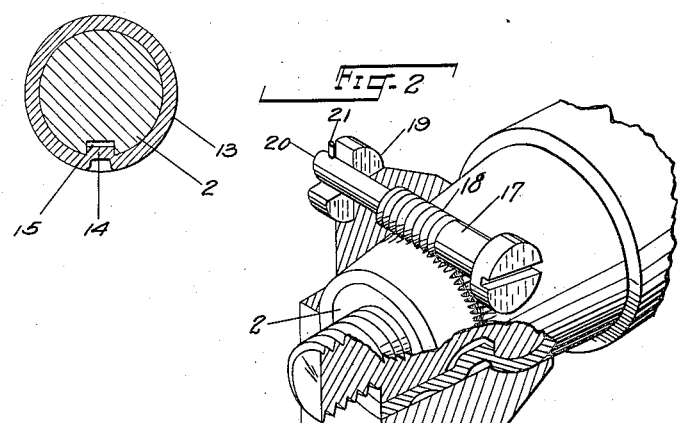
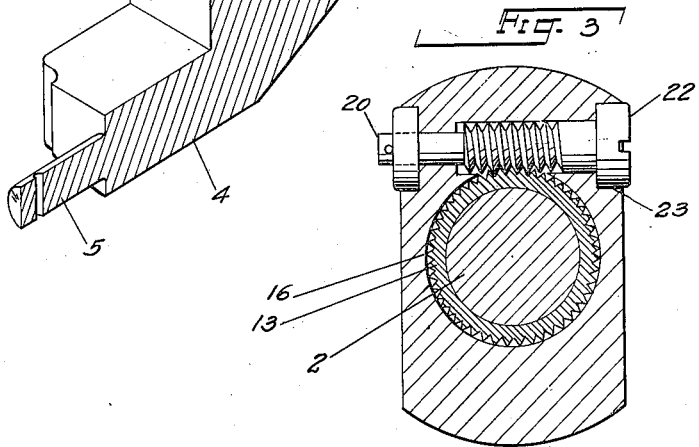
INVENTOR
WILLIAM J. BROWN
Albion D. T. Libby
ATTORNEY

UNITED STATES PATENT OFFICE.

WILLIAM J. BROWN, OF NEWARK, NEW JERSEY, ASSIGNOR TO SPLITDORF ELECTRICAL COMPANY, OF NEWARK, NEW JERSEY.

COUPLING DEVICE.

1,295,686.   Specification of Letters Patent.   Patented Feb. 25, 1919.

Application filed April 2, 1917. Serial No. 159,166.

*To all whom it may concern:*

Be it known that I, WILLIAM J. BROWN, a citizen of the United States, residing at Newark, in the county of Essex and State of New Jersey, have invented certain new and useful Improvements in Coupling Devices, of which the following is a specification.

My invention is directed to an improved type of coupling particularly useful in connecting a magneto or other ignition device to a driving shaft of an internal combustion engine for use on moving vehicles of various kinds. It may also be used to connect lighting generators to a driving shaft on such vehicles or it may be used in other combinations wherein a coupling is desired to connect two shafts together.

As applied to an ignition device, such as a magneto or timer-distributer, it provides simple means for accurately timing these devices when they are installed on the engine.

In many couplings used on automobiles at the present time a round disk of leather is used to which is fastened the two portions of the coupling device having arms extending at right angles to each other, the hub of one being attached to the driving shaft and the hub of the other being attached to the magneto or device to be driven. In installing a magneto on an engine by the use of such a coupling the engine must be turned so that the piston of the cylinder (for example No. 1) is at upper dead center, the magneto armature or rotor is then turned until the circuit breaker with the advance lever in full retard position just begins to open. It is then necessary to mark the position of the magneto half of the coupling and take the same off and cut a keyway therein to conform with the location of the keyway in the magneto armature or rotor. An alternative way is to fasten the coupling direct to the magneto shaft and then get the timing by setting the gear or driving mechanism of the engine. This necessitates, on an automobile, that the radiator be taken off and the gear case opened up in order to get at the driving shaft which drives the magneto or ignition device. It is the object of my invention to overcome these difficulties by providing a coupling one half of which is readily adjustable to give the proper timing.

Another object of my invention is to provide a coupling which is small and compact and cheap to manufacture.

Other and further objects will be apparent to one skilled in the art after a study of the specification taken in connection with the drawings, wherein Figure 1 illustrates one form of my coupling connected to a driving and driven shaft.

Fig. 2 is an enlarged view of the adjustable part of the coupling which is partly broken away in order to show the connection to the driven shaft.

Fig. 3 is a sectional view on the line 3—3 of Fig. 1.

Fig. 4 is a sectional view on the line 4—4 of Fig. 1.

Referring now particularly to the drawing, wherein like numbers refer to corresponding parts, 1 is the driving shaft, 2 the driven shaft which may be part of the magneto or a timer-distributer. 3 is the coupling member attached to the driving shaft 1 and 4 the coupling member attached to the driven shaft 2. Members 3 and 4 have pins 5 on arms 24 and 25 which pass through a flexible member 6, such as a piece of leather. Cotter pins 7 or wire may be threaded through the holes 8 in pins 5 for the purpose of holding the parts of the coupling in proper working relationship. The coupling member 3 is adapted to be fastened to the shaft 1 by means of a lockwasher 9 and nut 10, while coupling member 4 is partly held in position on the shaft 2 by lockwasher 11 and nut 12 which attachment will be hereinafter referred to. The end of shaft 2 is preferably made tapering and on this tapered portion is mounted a sleeve 13 which is indented at 14 to enter the keyway 15 in shaft 2. Sleeve 13 has a thread 16 cut around its periphery as shown in Figs. 2 and 3. Passing through the body of the coupling member is an adjusting screw 17, threads 18 of which are adapted to engage the threads 16 on the sleeve 13. The screw 17 has a collar 19 on its opposite extremity which collar is held in place on the stem 20 of screw 17 by means of a cotter pin 21 or the end of stem 20 may be riveted over to prevent the collar 19 from coming off. Preferably the collar 20 and the head 22 of screw 17 fit into counterbored recesses 23 of the coupling member 4.

From the above description of the parts of my coupling it will be readily apparent how the same is applied in practical operation. The engine crank shaft is turned until the piston of say No. 1 cylinder comes to upper dead center, the coupling member 3 having already been attached to the shaft 1 as previously described and also having the coupling member 4 fastened to it as heretofore described. The magneto or timing device having its advance lever in retard position and breaker nearly in position to open is then put into position on its support, with its shaft 2 entering the coupling member 4, lockwasher 11 and nut 12 being put on the threaded end of the shaft 2 as it is put into position but not drawn up tightly. By the use now of a screw-driver in the head 22 of the screw 17 the sleeve 13 and the shaft 2 are caused to rotate very slowly in the desired direction to cause the circuit breaker to open in accordance with the position of the engine piston as above described. When the proper adjustment has been made by screw 17 the nut 12 is drawn up tightly by means of a suitable wrench passing between the arms 24 and 25 of the coupling member 4. If found more convenient, after the timing has been obtained as above pointed out, the coupling member 4 may be disconnected from member 3, the cotter pins 7 or the wire used in holes 8 being left out until all work is done, and the entire ignition device slipped back in order to get better access to nut 12 for the purpose of tightening the same, after which the structure is merely pushed back in its original position and made fast on its support.

It will thus be seen that I have provided a very simple and effective means for getting an accurate adjustment of the coupling members which is highly advantageous for ignition purposes or for other purposes where accurate timing of the driven shaft is required and while I have shown but one form of coupling it will be apparent that numerous changes may be made in the details thereof without departing from the spirit of the invention and the scope of the claims.

Having thus described my invention what I claim is:—

1. In a device of the class described, the combination of a driving and a driven shaft, a coupling member securely attached to said driving shaft, a sleeve slidably but not rotatably carried on said driven shaft and having threads on its surface, a coupling member mounted on said sleeve, a screw threaded member carried by the last mentioned coupling member and coöperating with the threads on the sleeve for adjusting the position of the driven shaft relative to driving shaft without turning either of the coupling members and means for connecting said coupling members together.

2. In a device of the class described, the combination of a driving and a driven shaft, a coupling member for the driving shaft, a sleeve on the driven shaft having means to prevent relative rotation between the sleeve and shaft, a coupling member mounted on said sleeve, adjusting means on the last mentioned coupling member adapted to coöperate with the said sleeve to move the driven shaft with respect to the coupling member, means for holding the driven shaft in the coupling member and means for connecting the two coupling members together.

3. In a device of the class described, the combination of a driving member having a coupling member securely attached thereto, a driven member having a sleeve slidably but not rotatably mounted thereon, said sleeve having a screw thread cut circumferentially on its exterior surface, a coupling member adapted to be mounted on said sleeve and carrying an adjustable screw adapted to coöperate with screw threads on said sleeve for the purpose of turning said sleeve and driven shaft relative to the coupling member, means for holding the last mentioned coupling member onto the sleeve and shaft and means for connecting the two coupling members together.

In witness whereof I affix my signature.

WILLIAM J. BROWN.